No. 882,687. PATENTED MAR. 24, 1908.
H. D. JAMES.
ELECTRICAL CONTROL SYSTEM.
APPLICATION FILED APR. 3, 1905.
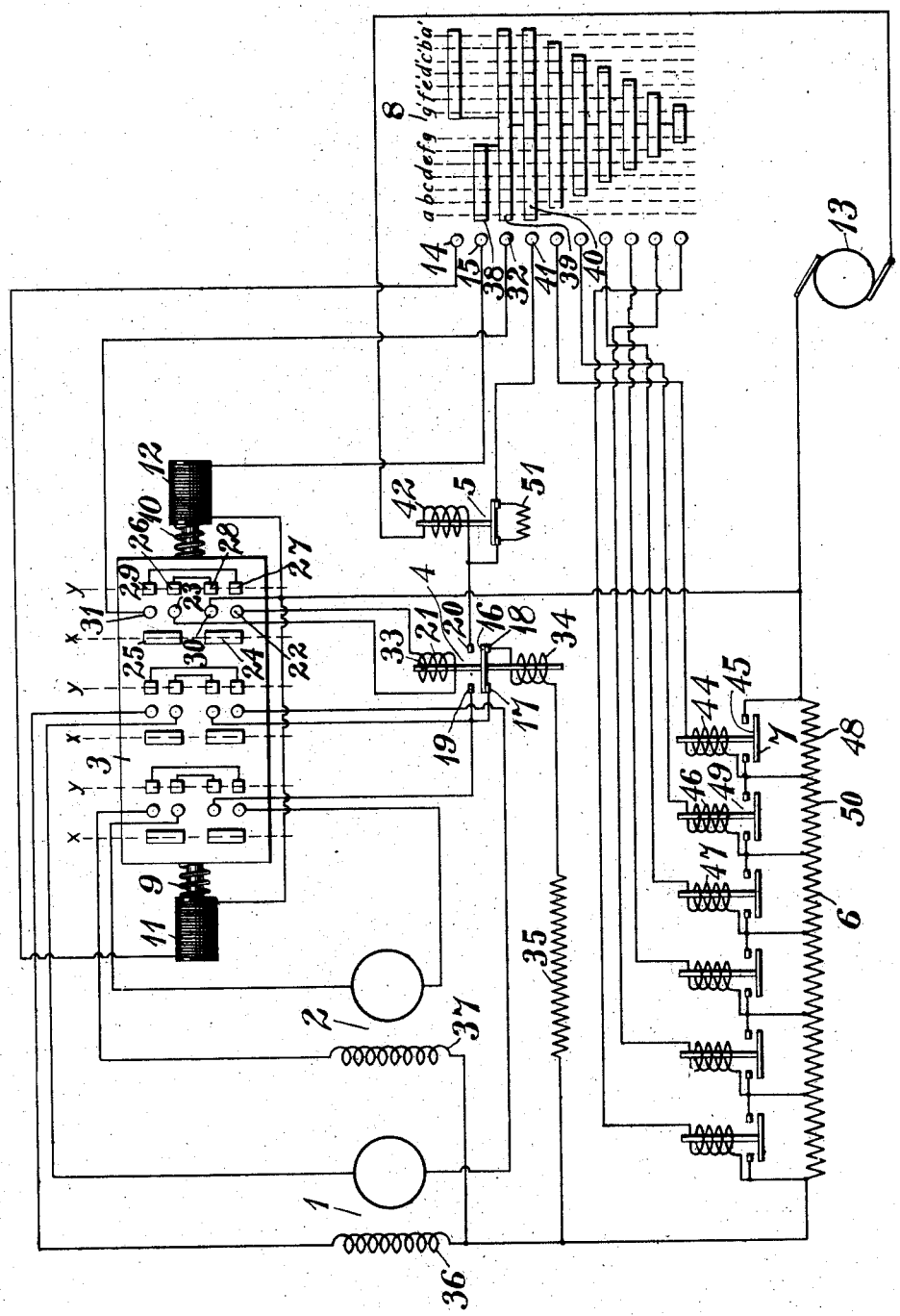
WITNESSES:
Fred H. Miller
Otto S. Schairer.
INVENTOR
Henry D. James
BY
Wesley G. Carr
ATTORNEY

UNITED STATES PATENT OFFICE.

HENRY D. JAMES, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRICAL CONTROL SYSTEM.

No. 882,687.   Specification of Letters Patent.   Patented March 24, 1908.

Application filed April 3, 1905. Serial No. 253,634.

*To all whom it may concern:*

Be it known that I, HENRY D. JAMES, a citizen of the United States, and a resident of Pittsburg, in the county of Allegheny and State of Pennsylvania, have invented a new and useful Improvement in Electrical Control Systems, of which the following is a specification.

My invention relates to systems of control for electric motors, and particularly to such systems as embody reversing switches and circuit-breakers.

The object of my invention is to provide means for preventing closing of the circuit-breaker when the reversing switch is thrown from its forward to its reverse position, or vice versa, unless the counter electromotive force generated by the motor is less than a predetermined amount.

The single figure of the accompanying drawing illustrates a system embodying my invention.

The system comprises electric motors 1 and 2, a reversing switch 3, a circuit-breaker 4, an overload relay device 5, a regulating resistance 6, switches 7 for shunting or cutting out sections of the regulating resistance 6, and a master switch 8 that governs the operation of the reversing switch 3 and of the switches 7.

The reversing switch 3 is normally maintained in open-circuit position by means of springs 9 and 10 and is operated by means of magnet windings 11 and 12, one terminal of each of which is connected to one terminal of any suitable source of energy, such as a generator 13, the remaining terminals being connected to contact fingers 14 and 15 of the master switch 8.

The circuit-breaker 4 comprises a switch member 16 that is adapted to engage contact-terminals 17 and 18 when in its open position and contact terminals 19 and 20 when it is closed. The circuit-breaker is provided with an operating magnet winding 21, the terminals of which are connected to contact fingers 22 and 23, which are adapted to be engaged by conducting segments 24, 25, 26 and 27 that are carried by the movable member of the reversing switch 3. Other conducting segments 28 and 29 which are also carried by the movable member of the reversing switch are adapted to engage stationary contact fingers 30 and 31 that are respectively connected to the generator 13 of the system and to contact finger 32 of the master switch 8. The switching device just described is provided for the purpose of insuring demagnetization of the core 33, which is operated by the magnet winding 21 when the reversing switch is thrown from forward to reverse position or vice versa.

A second magnet winding 34 is provided for the circuit-breaker 4 and is connected in series with a resistance 35 between contact terminal 18 and terminals of field magnet windings 36 and 37 of the motors 1 and 2. If the reversing switch is moved quickly from one closed-circuit position to the other, the circuit-breaker 4 opens, terminal pieces 17 and 18 are electrically connected and the motors are converted into generators which supply energy to the winding 34 and act as dynamic brakes. The circuit-breaker is held open by the winding 34 until the electromotive force of the motors, operating as generators, is decreased to such an extent that the attractive force exerted by the winding 34 upon its core is neutralized and overpowered by that exerted by the winding 21 upon its core 33.

When the master switch 8 is moved to position *a*, a circuit is established from one terminal of the generator 13 through operating magnet winding 12 of the reversing switch 3, contact finger 15, conducting segments 38, 39 and 40, contact finger 41, overload relay switch 5, operating magnet winding 42 of the said switch, to the other terminal of the generator. The reversing switch 3 is then thrown so that the conducting segments on lines X engage the corresponding contact fingers. A circuit is then established from one terminal of the generator 13 through contact finger 30, conducting segment 24, contact finger 22, operating magnet winding 21, contact finger 23, conducting segment 25, contact fingers 31 and 32, conducting segments 39 and 40, contact finger 41, overload relay 5, and its coil 42, to the other terminal of the generator 13. The circuit-breaker 4 may then be closed, if the motors are at rest, and energy will then be supplied to the motors through all of the regulating resistance 6.

If the master switch 8 is moved to the position *b*, operating magnet winding 44 of switch 45 is energized, and if the master switch is moved through the succeding positions from *b* to *g*, inclusive, circuits will be established through the remaining operating magnet windings 46, 47, etc. The switch 45 will not be closed until the counter electromotive force generated by the motors exceeds a predetermined amount; that is, until the drop in electromotive force over section 48 of the regulating resistance 6 falls below a predetermined amount, and switch 49 will not be closed by its operating magnet winding 46 until the drop in the electromotive force over section 50 of the regulating resistance 6 falls below a predetermined amount.

If the master switch be moved to position $a'$, the reversing switch magnet 11 will be energized and the movable member of the switch will be actuated to cause the conducting segments on lines $y$ to engage the respective fingers and thereby reverse the circuits of the motors 1 and 2, as will be understood without specifically pointing out the circuits and connections thus established. Further movement of the master switch to positions $b'$, $c'$, $d'$, etc., will effect control of the motors by means of the switches 45, 49, etc., and the other elements of the system in the manner already described, the only change being in the direction of rotation of the motors.

Since the operation of the switches for shunting the sections of the regulating resistance forms no part of my present invention, I deem it unnecessary to describe their operation more in detail.

If the electromotive force of the supply circuit rises above a predetermined amount, or if the current supplied to the motors exceeds a predetermined amount, the operating magnet winding 42 of the switch 5 is energized sufficiently to open the switch and insert resistance 51 in series with the operating magnet windings 44, 46, 47, etc., thereby retarding or preventing operation of the switches 45, 49, etc.

I claim as my invention:

1. The combination with one or more electric motors, a reversing switch, and a circuit-breaker, of means for preventing closing of the circuit-breaker while the electromotive force generated by the motor or motors exceeds a predetermined amount, and means operated by the circuit-breaker for connecting the motor or motors in a closed circuit while the circuit-breaker is open.

2. The combination with one or more electric motors, a reversing switch, and a circuit-breaker, of means for retaining the circuit-breaker in open position after the reversing switch has been moved from one closed-circuit position to another and while the electromotive force generated by the motor or motors exceeds a predetermined amount, and means operated by the circuit-breaker for connecting the motor or motors in a closed circuit while the circuit-breaker is open.

3. The combination with one or more electric motors, and a reversing switch, of a circuit-breaker, having an operating magnet winding the circuit connections of which are governed by the reversing switch, and a holding magnet winding the circuit of which may be established only when the circuit-breaker is open.

4. The combination with one or more electric motors, and a reversing switch, of a circuit-breaker, having an operating magnet winding the circuit connections of which are governed by the reversing switch, and a holding magnet winding for retaining the circuit-breaker in open position after the reversing switch has been moved from one closed-circuit position to another and while the electromotive force exceeds a predetermined amount, the circuit of said holding magnet winding being established only when the circuit-breaker is open.

5. The combination with one or more electric motors, a reversing switch, and a circuit-breaker, of an operating magnet winding for the circuit-breaker the circuit connections of which are governed by the reversing switch, a holding magnet winding for retaining the circuit-breaker in open position after the reversing switch has been moved from one closed-circuit position to another and while the electromotive force exceeds a predetermined amount, and means operated by the circuit breaker for connecting the motor or motors in a closed circuit while the circuit-breaker is open.

6. The combination with one or more electric motors, a reversing switch, and a circuit-breaker, of means for preventing closing of the circuit-breaker after the reversing switch has been moved from one closed-circuit position to another and while the electromotive force generated by the motor or motors exceeds a predetermined amount, and means operated by the circuit-breaker for connecting the motor or motors in a closed circuit while the circuit-breaker is open.

In testimony whereof, I have hereunto subscribed my name this 22nd day of March, 1905.

HENRY D. JAMES.

Witnesses:
OTTO S. SCHAIRER,
BIRNEY HINES.